US012697957B2

(12) United States Patent
Ahn et al.

(10) Patent No.: US 12,697,957 B2
(45) Date of Patent: Aug. 4, 2026

(54) HYBRID ELECTRIC VEHICLE AND METHOD OF DRIVING CONTROL FOR SAME

(71) Applicants: HYUNDAI MOTOR COMPANY, Seoul (KR); KIA CORPORATION, Seoul (KR)

(72) Inventors: Tae Jun Ahn, Suwon-si (KR); Jong Bum Oh, Gwacheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 291 days.

(21) Appl. No.: 18/137,513

(22) Filed: Apr. 21, 2023

(65) Prior Publication Data

US 2024/0174213 A1    May 30, 2024

(30) Foreign Application Priority Data

Nov. 24, 2022    (KR) ......................... 10-2022-0159262

(51) Int. Cl.
*B60W 20/10*        (2016.01)
*B60K 6/40*         (2007.10)
(Continued)

(52) U.S. Cl.
CPC .............. *B60W 20/10* (2013.01); *B60K 6/40* (2013.01); *B60W 10/06* (2013.01); *B60W 10/08* (2013.01);
(Continued)

(58) Field of Classification Search
CPC ...... B60W 20/10; B60W 10/06; B60W 10/08; B60W 10/02; B60W 20/40; B60W 20/00; B60W 20/15; B60W 2510/10; B60W 2510/242; B60W 2510/0208; B60W 2510/0638; B60W 2510/081; B60W 2510/244; B60W 2710/0627; B60W 2710/08; B60W 2710/0616; B60K 6/40;
(Continued)

(56) References Cited

U.S. PATENT DOCUMENTS 10,890,143 B2 *  1/2021  Ikuta ..................... F02D 41/025
11,312,356 B2    4/2022  Park
(Continued)

FOREIGN PATENT DOCUMENTS

JP        2005256732 A      9/2005
JP        2007126075 A      5/2007
(Continued)

*Primary Examiner* — Mary Cheung
(74) *Attorney, Agent, or Firm* — Lempia Summerfield Katz LLC

(57) ABSTRACT

A hybrid electric vehicle controlling a fuel injection point-in-time and a method of controlling driving of the hybrid electric vehicle such that fuel efficiency is improved when engine start is required. The method of controlling driving of the hybrid electric vehicle may include: inhibiting engine injection when there is an engine start request and a control entry condition is satisfied, performing the engine injection when an injection allowable condition is satisfied with the engine injection inhibited, and performing reaction force control along with the engine injection through a first motor directly connected to the engine.

19 Claims, 3 Drawing Sheets

(51) Int. Cl.
B60W 10/06 (2006.01)
B60W 10/08 (2006.01)
F02D 41/06 (2006.01)
F02D 41/38 (2006.01)

(52) U.S. Cl.
CPC ........... *F02D 41/062* (2013.01); *F02D 41/38* (2013.01); *B60W 2510/0208* (2013.01); *B60W 2510/0638* (2013.01); *B60W 2510/081* (2013.01); *B60W 2510/244* (2013.01); *B60W 2710/0627* (2013.01); *B60W 2710/08* (2013.01); *B60Y 2200/92* (2013.01); *F02D 2200/101* (2013.01); *F02D 2200/50* (2013.01)

(58) Field of Classification Search
CPC ........ B60K 6/387; B60K 6/442; B60K 6/547; B60Y 2200/92; F02D 41/062; F02D 41/38; F02D 2200/101; F02D 2200/50; Y02T 10/62
See application file for complete search history.

(56) References Cited

U.S. PATENT DOCUMENTS

| | | | |
|---|---|---|---|
| 2004/0069548 A1 | 4/2004 | Kira et al. | |
| 2013/0226380 A1* | 8/2013 | Ando | F02D 41/3094 903/930 |
| 2020/0139955 A1 | 5/2020 | Park | |
| 2020/0300189 A1* | 9/2020 | Pursifull | F02D 41/3845 |
| 2021/0129823 A1* | 5/2021 | Byun | B60W 10/06 |

FOREIGN PATENT DOCUMENTS

| | | | | |
|---|---|---|---|---|
| JP | 2010179716 A | | 8/2010 | |
| JP | 2012250704 A | * | 12/2012 | B60K 6/445 |
| JP | 2013216204 A | | 10/2013 | |
| KR | 20200050494 A | | 5/2020 | |
| KR | 20210118611 A | | 10/2021 | |

* cited by examiner

HYBRID ELECTRIC VEHICLE AND METHOD OF DRIVING CONTROL FOR SAME

CROSS REFERENCE TO RELATED APPLICATION

The present application claims priority to Korean Patent Application No. 10-2022-0159262, filed on Nov. 24, 2022, the entire contents of which are incorporated herein by reference.

FIELD

The present disclosure relates to a hybrid electric vehicle that can control a fuel injection point-in-time such that fuel efficiency is improved when engine start is required, and a method of controlling driving of the hybrid electric vehicle.

BACKGROUND

The statements in this section merely provide background information related to the present disclosure and may not constitute prior art.

Recently, the popularity of eco-friendly vehicles powered by electric motors is on the rise due to the heightened focus on preserving the environment. An eco-friendly vehicle is also called an electrified vehicle. A Hybrid Electric Vehicle (HEV) and an Electric Vehicle (EV) are representative of eco-friendly vehicles.

A hybrid electric vehicle of eco-friendly vehicles can achieve high efficiency by selectively driving an engine and a motor, depending on the driving situation. Such a hybrid electric vehicle can be classified into various types in accordance with the connection relationship of the powertrain. For example, a Transmission Mounted Electric Drive (TMED) type is a hybrid electric vehicle equipped with a powertrain that features an engine clutch disposed between an engine and a motor, with a driving motor connected to the input side of a transmission. A TMED-type hybrid electric vehicle is equipped with a Hybrid Starter Generator (HSG) that cranks for starting the engine or collecting kinetic energy of the engine, and the HSG and the engine are generally connected through a belt.

In general, when a TMED-type hybrid electric vehicle is required to start an engine, revolutions per minute (RPM) of the engine is increased up to a predetermined level by a Hybrid Starter Generator (HSG) with an engine clutch open and then fuel is injected, thereby starting the engine. Thereafter, when the difference between the actual RPM of the engine and a target RPM for engaging the engine clutch converges within a predetermined level, the engine clutch is engaged. However, as described above, since the hybrid starter generator and the engine are connected through a belt, a damping force of the belt acts when torque of the hybrid starter generator is transmitted. Accordingly, there is limitation in controlling torque variation of the engine by fuel injection using the hybrid starter generator, so vibration may be generated when the engine is started. In particular, when such vibration by fuel injection is generated with the engine clutch engaged, the vibration is transmitted to the drivetrain, so a driver may feel disconnection. As a result, the point in time of fuel injection is limited such that fuel start to be injected into an engine before an engine clutch is engaged when it is required to start the engine in general hybrid electric vehicles, and accordingly, non-driving fuel loss that fuel is consumed even before the power from the engine is transmitted to a wheel shaft.

SUMMARY

An objective of the present disclosure is to provide a hybrid electric vehicle that can control a fuel injection time point such that fuel efficiency is improved when engine start is required, and a method of controlling driving of the hybrid electric vehicle.

The technical subjects to implement in the present disclosure are not limited to the technical problems described above and other technical subjects that are not stated herein will be clearly understood by those skilled in the art from the following specifications.

A method of controlling driving of a hybrid electric vehicle according to an embodiment of the present disclosure for achieving the objectives includes: inhibiting engine injection when there is an engine start request and a control entry condition is satisfied; performing the engine injection when an injection allowable condition is satisfied with the engine injection inhibited; and performing reaction force control along with the engine injection through a first motor directly connected to the engine.

In one embodiment, the control entry condition may include a shift condition, a powertrain mode condition, and a State of Charge (SOC) condition of a battery.

The control entry condition may be satisfied when all of the shift condition, the powertrain mode condition, and the SOC condition are satisfied.

The shift condition may be satisfied in preset shift phase and shift class, the powertrain mode condition may be satisfied when a target powertrain mode is a mode in which power from the engine is transmitted to wheels, and the SOC condition may be satisfied when a current SOC is over a preset reference SOC.

The injection allowable condition may include an engine RPM condition, a motor RPM condition, and a state condition of an engine clutch disposed between the engine and a second motor.

The injection allowable condition may be satisfied when at least one of the engine RPM condition, the motor RPM condition, and the state condition of the engine clutch is satisfied.

The engine RPM condition may be satisfied when an RPM of the engine approaches a control target RPM, the motor RPM condition may be satisfied when an RPM of the first motor is larger than a preset RPM, and the state condition of the engine clutch may be satisfied when the engine clutch is in a lock-up state.

In one embodiment, the method may further include controlling an operating point of the first motor to a previous operating point after the reaction force control, and the reaction force control may be continued for a preset time.

In one embodiment, the performing of the engine injection may include turning off the injection inhibition when the injection allowable condition is satisfied.

A hybrid electric vehicle according to an embodiment includes: a first motor; an engine directly connected to the first motor; a second motor directly connected to an input side of a transmission; an engine clutch configured to selectively connect the engine and the second motor to each other; and a control unit configured to inhibit engine injection when there is an engine start request and a control entry condition is satisfied, to allow the engine injection when an injection allowable condition is satisfied with the engine injection inhibited, and to perform reaction force control along with the engine injection through the first motor.

The control entry condition may include a shift condition, a powertrain mode condition, and a State of Charge (SOC) condition of a battery.

The control unit may determine that the control entry condition is satisfied when all of the shift condition, the powertrain mode condition, and the SOC condition are satisfied.

The shift condition may be satisfied in preset shift phase and shift class, the powertrain mode condition may be satisfied when a target powertrain mode is a mode in which power from the engine is transmitted to wheels, and the SOC condition may be satisfied when a current SOC is over a preset reference SOC.

The injection allowable condition may include an engine RPM condition, a motor RPM condition, and a state condition of the engine clutch.

For example, the control unit may determine that the injection allowable condition is satisfied when at least one of the engine RPM condition, the motor RPM condition, and the state condition of the engine clutch is satisfied.

In one embodiment, the engine RPM condition may be satisfied when an RPM of the engine approaches a control target RPM, the motor RPM condition may be satisfied when an RPM of the first motor is larger than a preset RPM, and the state condition of the engine clutch may be satisfied when the engine clutch is in a lock-up state.

In one embodiment, the control unit may control the reaction force control to be continued for a preset time and may control an operating point of the first motor to a previous operating point after the reaction force control.

In one embodiment, the control unit may turn off the injection inhibition when the injection allowable condition is satisfied.

According to various embodiments of the present disclosure described above, a fuel injection point-in-time is limited to priority to engagement of the engine clutch when engine start is requested, so fuel efficiency is improved.

Further, since reaction force control for engine torque due to fuel injection is performed through the first motor directly connected to the engine, disconnection can be reduced and drivability can be improved.

The effects that can be obtained by the present disclosure are not limited to the effects described above and other effects can be clearly understood by those having ordinary skill in the art from the following description.

BRIEF DESCRIPTION OF THE DRAWINGS

The accompanying drawings of this specification illustrate some embodiments and help easy understanding of the present disclosure along with the following detailed description, so the present disclosure should not be construed as being limited to the drawings.

DETAILED DESCRIPTION

Figure 1:
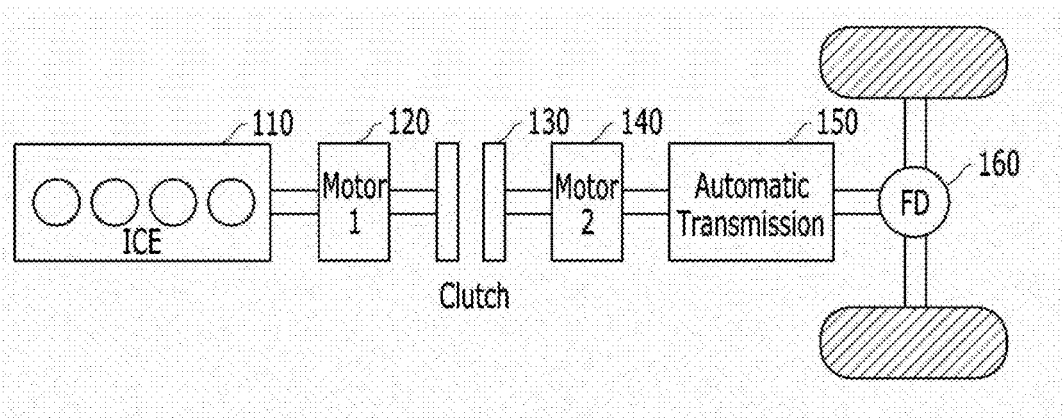
FIG. 1 schematically illustrates the configuration of a powertrain of a hybrid electric vehicle according to an embodiment of the present disclosure.

Hereafter, embodiments of the present disclosure are described in detail with reference to the accompanying drawings and the same or similar components are given the same reference numerals regardless of the numbers of figures and are not repeatedly described. Terms "module" and "unit" that are used for components in the following description are used only for the convenience of description without having discriminate meanings or functions. In the following description, if it is decided that the detailed description of known technologies related to the present disclosure makes the subject matter of the embodiments described herein unclear, the detailed description is omitted. Further, the accompanying drawings are provided only for easy understanding of embodiments disclosed in the specification, and the technical spirit disclosed in the specification is not limited by the accompanying drawings, and all changes, equivalents, and replacements should be understood as being included in the spirit and scope of the present disclosure.

Terms including ordinal numbers such as "first", "second", etc., may be used to describe various components, but the components are not to be construed as being limited to the terms. The terms are used only to distinguish one component from another component. When a component, device, element, or the like of the present disclosure is described as having a purpose or performing an operation, function, or the like, the component, device, or element should be considered herein as being "configured to" meet that purpose or to perform that operation or function.

It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprise" or "have" used in this specification, specify the presence of stated features, steps, operations, components, parts, or a combination thereof, but do not preclude the presence or addition of one or more other features, numerals, steps, operations, components, parts, or a combination thereof.

A unit or a control unit that included in names such as a motor control unit (MCU) and a hybrid control unit (HCU) is only a term that is generally used to name a controller that controls specific functions of a vehicle rather than meaning a generic function unit. For example, each control unit may include a communication device that communicates with another control unit or a sensor to control corresponding functions, a memory that stores an operating system or logic commands and input/output information, and one or more processors that performs determination, calculation, decision, etc. for controlling the corresponding functions.

Before describing a method of controlling a fuel injection point-in-time when engine start is required according to embodiments of the present disclosure, the structure and the control system of a hybrid electric vehicle that can be applied to embodiments are described first.

FIG. 1 shows an example of the configuration of a powertrain of a hybrid electric vehicle according to an embodiment of the present disclosure.

Referring to FIG. 1, a powertrain of a hybrid electric vehicle including a parallel type hybrid system in which two motors 120 and 140 and an engine clutch 130 are mounted between an engine (internal combustion engine (ICE)) 110 and a transmission 150 is shown. Such a parallel type hybrid system is also called a transmission mounted electric drive (TMED) hybrid system because the motor 140 is always connected to the input side of the transmission 150.

A first motor 120 of the two motors 120 and 140 is disposed between the engine 110 and a first end of the engine clutch 130, and an engine shaft of the engine 110 and a first motor shaft of the first motor 120 are directly connected to each other, whereby they can always rotate along.

A first end of a second motor shaft of a second motor 140 may be connected to a second end of the engine clutch 130 and a second end of the second motor shaft may be connected to the input side of the transmission 150.

The second motor 140 has large power in comparison to the first motor 120 and can function as a driving motor. The first motor 120 can function as a starter motor that cranks the engine 110 when the engine 110 is started, can collect rotation energy of the engine 110 by generating electricity when the engine is stopped, and can generate electricity using the power from the engine 110 when the engine 110 is in operation.

In a hybrid electric vehicle having the powertrain shown in FIG. 1, when a driver starts the vehicle and depresses the accelerator pedal, the second motor 140 is driven first by the power of a battery (not shown) with the engine clutch 130 open. Accordingly, the power from the second motor 140 is transmitted to the transmission 15 and a final drive (FD) 160, whereby wheels are rotated (i.e., EV mode). When larger driving force is needed while the vehicle is gradually accelerated, the first motor 120 is operated and can crank the engine 110.

When the rotation speed difference between the engine 110 and the second motor 140 comes into a predetermined range after the engine 110 is started, the engine clutch 130 is finally engaged and the engine 110 and the second motor 140 are rotated along (i.e., changing into an HEV mode from an EV mode). Accordingly, the power of the second motor 140 decreases and the power of the engine 110 increases through torque blending, thereby being able to satisfy the torque requested by the driver. In the HEV mode, the engine 110 can satisfy most of requested torque and the difference between the engine torque and the requested torque can be compensated by at least one of the first motor 120 and the second motor 140. For example, when the engine 110 outputs torque larger than requested torque in consideration of efficiency of the engine 110, the first motor 120 or the second motor 140 generates electricity by the surplus of the engine torque. However, when the engine torque is smaller than requested torque, at least one of the first motor 120 and the second motor can output torque by the shortage.

When a predetermined engine-off condition such as deceleration of the vehicle is satisfied, the engine clutch 130 is opened and the engine 110 is stopped (i.e., changing into the EV mode from the HEV mode). A battery is charged by the second motor 140 using the driving force of wheels in deceleration, which is called braking energy regeneration or regenerative braking.

In generally, the transmission 150 may be a discontinuously variable transmission or a multi-plate clutch, for example, a dual clutch transmission (DCT).

Figure 2:
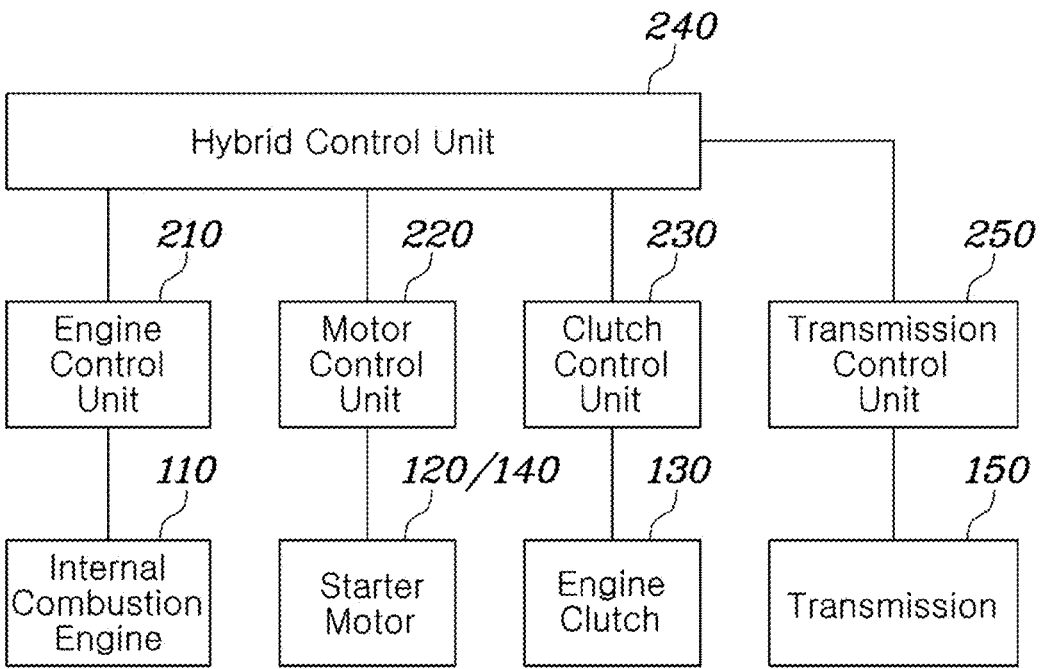
FIG. 2 schematically illustrates the configuration of a control system of the hybrid electric vehicle according to an embodiment of the present disclosure.

FIG. 2 shows an example of the configuration of a control system of the hybrid electric vehicle according to an embodiment of the present disclosure.

Referring to FIG. 2, in a hybrid electric vehicle to which embodiments of the present disclosure can be applied, an engine control unit 210 can control the internal combustion engine 110, torque of the first motor 120 and the second motor 140 can be controlled by a motor control unit (MCU) 220, and a clutch control unit 230 can control the engine clutch 130. The engine control unit 210 may be referred to as an engine management system (EMS). A transmission control unit 250 controls the transmission 150.

The motor control unit 220 can control a gate drive unit (not shown) using a pulse width modulation (PWM) type of control signal based on a motor angle, a phase voltage, a phase current, requested torque, etc. of each of the motors 120 and 140, and the gate drive unit can control an inverter (not shown) that drives each of the motors 120 and 140.

The control units are connected to a hybrid control unit (HCU) 240 that controls the entire powertrain including a mode change process as an upper control unit, thereby being able to provide a driving mode change, information for controlling the engine clutch in shifting, and/or information for stopping the engine to the hybrid control unit 240 or to perform operations according to control signals under control by the hybrid control unit 240.

For example, the hybrid control unit 240 determines whether to switch the EV and HEV modes or CD and CS modes (in a PHEV), depending on the driving state of the vehicle. To this end, the hybrid control unit determines the point in time of opening the engine clutch 130 and performs hydraulic control when the engine clutch 130 is opened. The hybrid control unit 240 can determine the states (lock-up, slip, open, etc.) of the engine clutch 130 and can control the point in time of stopping fuel injection of the engine 110. The hybrid control unit can control collection of rotation energy of the engine by transmitting a torque instruction for controlling the torque of the first motor 120 to the motor control unit 220 to control engine stop. The hybrid control unit 240, in order to satisfy requested torque, can determine the states of the driving sources 110, 120, and 140, determine requested driving force that the driving sources 110, 120, and 140 are supposed to separately take over, and transmit a torque instruction to the control units 210 and 220 that control the driving sources.

Of course, it is apparent to those skilled in the art that the connection relationship of the control units and the functions/discrimination of the control units described above are only examples and are not limited to the names. For example, the hybrid control unit 240 may be implemented such that a corresponding function is replaced and provided by any one of the other control units, or the corresponding function may be separately provided by two or more of the other control units.

The configuration described with reference to FIGS. 1 and 2 is only an exemplary configuration of a hybrid electric vehicle and it will be apparent to those skilled in the art that a hybrid electric vehicle to which embodiments of the present disclosure is not limited to the structure described above.

Hereafter, fuel injection point-in-time control when engine start is required according to an embodiment of the present disclosure is described.

In the powertrain described above with reference to FIG. 1, when fuel is injected through the first motor 1 directly connected to the engine 110, reaction force control corresponding to engine torque is possible without a specific damping factor (e.g., a belt). Accordingly, when reaction force control is appropriately performed by the first motor 120, the possibility of disconnection is low even though torque by fuel injection (hereafter, referred to as "injection") is transmitted to a drivetrain, so fuel injection does not need to be necessarily performed before the engine clutch is engaged. Accordingly, there is an engine start request, injection is inhibited until a predetermined injection allowable condition is satisfied, and then, when the condition is satisfied, the present disclosure proposes to turn off the inhibition (i.e., allow injection) and perform reaction force control corresponding to injection using the first motor 120. Detailed control process and condition are described with reference to FIGS. 3 and 4.

Figure 3:
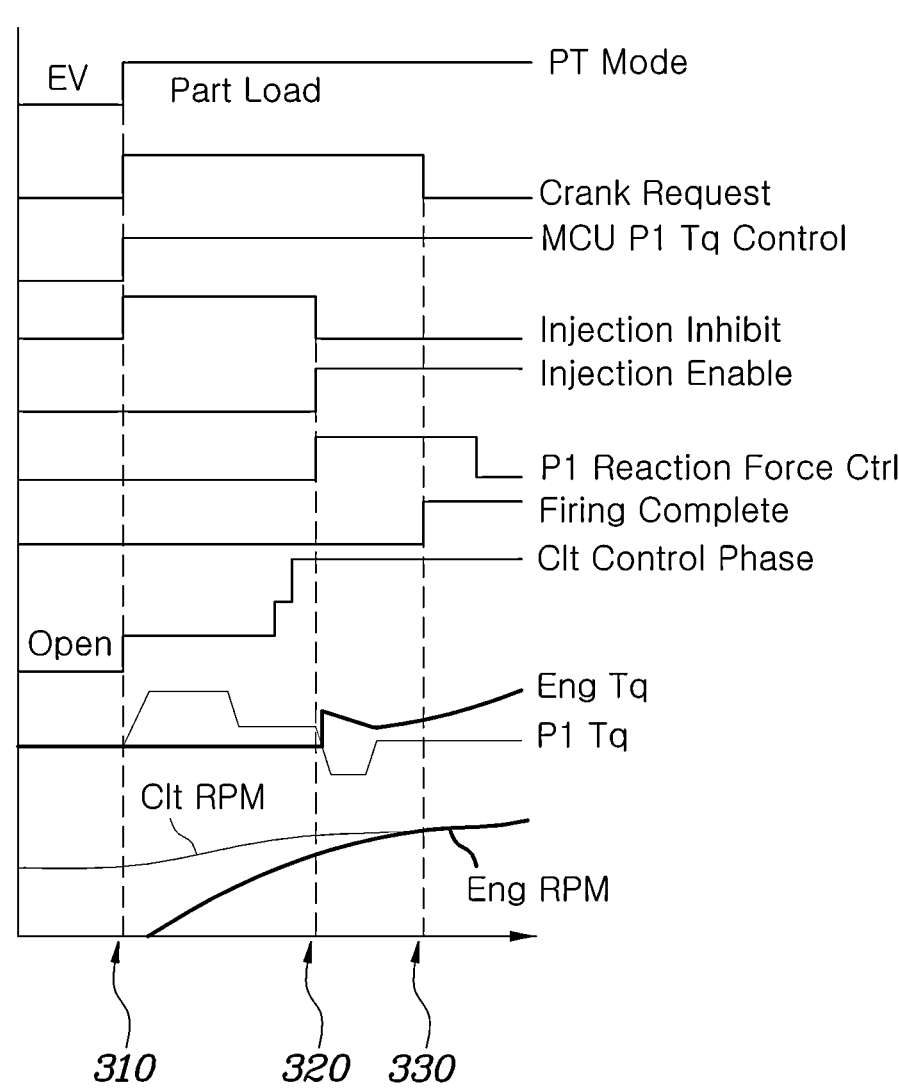
FIG. 3 illustrates a powertrain (PT) mode of the hybrid electric vehicle according to an embodiment of the present disclosure.

FIG. 3 illustrates a powertrain (PT) mode of the hybrid electric vehicle according to an embodiment of the present disclosure. In the graph shown in FIG. 1, the horizontal axis is time and the vertical axis is each control condition or the state of a driving source.

Referring to FIG. 3, the powertrain (PT) mode of a hybrid electric vehicle according to an embodiment is in an EV mode. In the EV mode, the engine 110 is open and the engine clutch 130 is open (i.e., Clt Control Phase: Open). The powertrain mode may mean a control mode of a hybrid powertrain that is determined based on the driving situation of the hybrid electric vehicle.

In the EV mode, due to an increase of requested torque by a driver, or the like, an engine start request (Crank Request) is activated at the point in time at which the hybrid control unit 240 determines a part load HEV mode as a target powertrain mode and injection inhibition may be set to adjust an injection point-in-time. The part load mode may mean controlling an air fuel ratio λ of the engine 110 at a specific value (e.g., 1) and controlling Brake specific fuel consumption (BSFC) at an optimal operating point. However, this situation is an example, and any situation is not limited as long as it is required to change the engine 110 into an on-state from an off-state. Torque control for the first motor 120 by the motor control unit 220 (MCU P1 Tq Control) may be activated by activation of the engine start request (Crank Request). Accordingly, the torque (P1 Tq) of the first motor 120 increases and the engine RPM (ENG RPM) increases. However, injection is not performed at the current point in time 310 due to injection inhibition. Further, as the part load mode is performed, an engine clutch control phase (Clt Control Phase) may also transit into a lock-up state from an off-state.

Thereafter, the hybrid control unit 240 turns off injection inhibition (Injection Inhibit OFF) and activates injection allowance (Injection Enable) at the point in time 320 at which it is determined that a preset injection allowable condition is satisfied. Accordingly, the engine control unit 210 starts fuel injection into the engine 110 and the motor control unit 220 starts reaction force control (P1 Reaction Force Ctrl) for reducing a reaction force due to torque that is generated at the engine 110. The preset injection allowable condition may include at least one of an engine speed synchronization level, a motor speed, and an engine clutch state. More detailed injection allowable conditions are described below with reference to FIG. 4.

Thereafter, the hybrid control unit 240 can turn off an engine start request (Crank Request) at the point in time 330 at which it is determined that starting the engine 110 has been completed (Firing Complete), and can stop reaction force control (P1 Reaction Force Ctrl) through the first motor 120 after a predetermined time elapses. In this case, the first motor 120 can be controlled by a default control logic, for example, to return to the previous operating point, etc.

As the engine start control described above is performed, the injection point-in-time is not limited to before the engine clutch 130 engagement, so unnecessary fuel consumption can be prevented. Through the reaction control of the first motor (120), the ignition irregularity is reduced, and since the injection is performed at a higher RPM than the idle area of the engine mainly concentrated in the low RPM area, it is possible to prevent the ignition irregularity due to idle.

The engine start control process according to an embodiment described above is arranged into a flowchart of FIG. 4.

Figure 4:
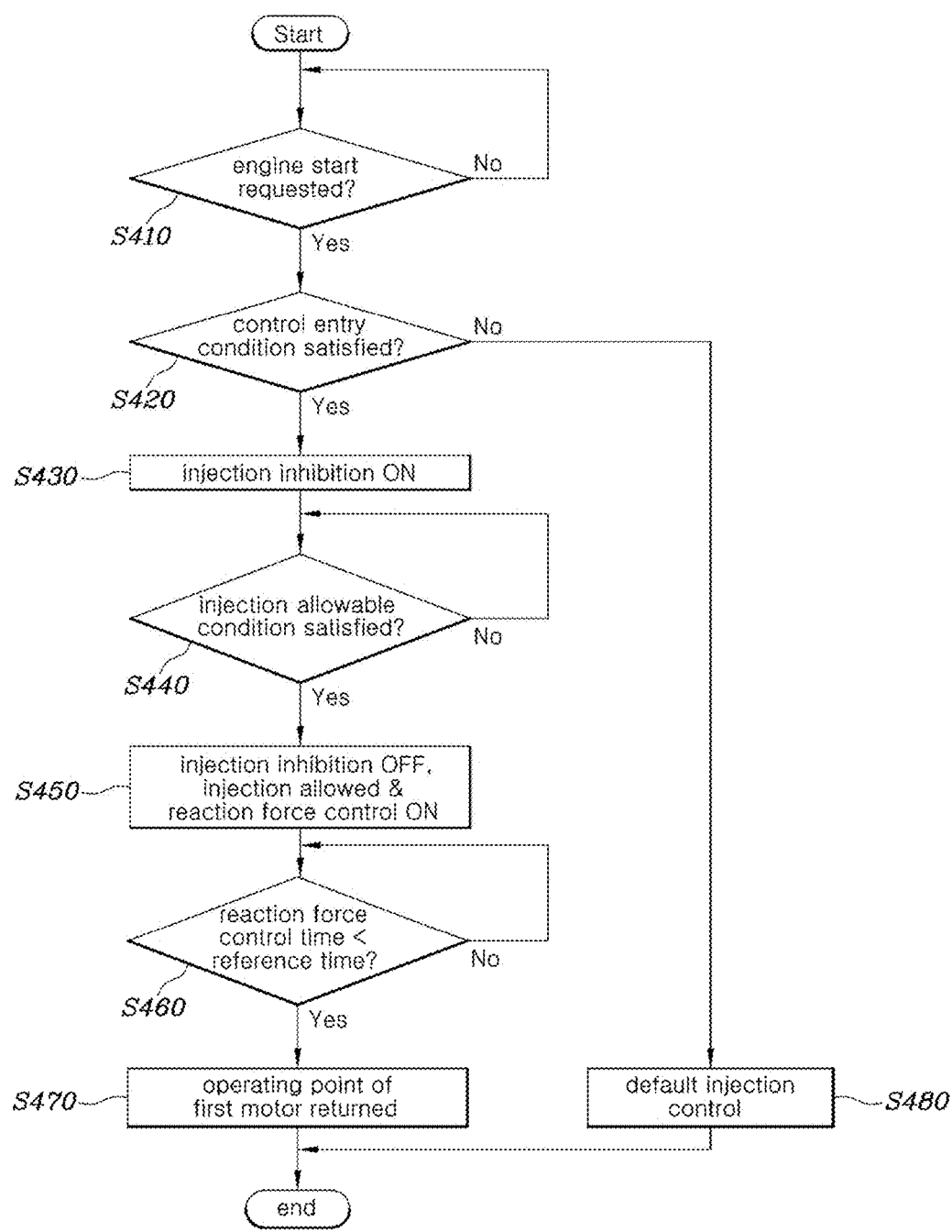
FIG. 4 is a flowchart illustrating the engine start control process of the hybrid electric vehicle according to an embodiment of the present disclosure.

FIG. 4 is a flowchart illustrating the engine start control process of the hybrid electric vehicle according to an embodiment of the present disclosure.

Referring to FIG. 4, the hybrid control unit 240 determines whether an engine start request (Crank Request) is generated (S410). The engine start request may be required when power from the engine 110 is needed due to an increase in requested torque/requested power, when it is required to increase the temperature of cooling water in an air conditioning system, when a battery needs to be charged with power from the engine 110, etc., but these are examples and the present disclosure is not necessarily limited thereto.

When there is an engine start request (Yes in S410), the hybrid control unit 240 can determine whether a preset control entry condition is satisfied (S420).

The preset control entry condition may include a shift condition, a powertrain mode condition, the State of Charge (SOC) condition of a battery.

First, the shift condition may be a condition to prevent a problem that disconnection is generated when shift control and injection are simultaneously performed in a specific shift phase or shift class. The shift phase is for discriminating the steps of shift control, in which transmission hydraulic pressure and a torque control method are defined for each control step. For example, the shift phase may include a torque phase and an inertia phase, but is not necessarily limited thereto. The shift class means the type of shifting and may be discriminated based on whether a pedal is operated, and upshift/downshift. For example, in the shift class, upshift for acceleration may be referred to as power-on upshift (or forward drive upshift) and upshift when an accelerator pedal is released may be referred to power-off upshift, but the present disclosure is not necessarily limited thereto.

As described above, the shift phase and the shift class may be defined in various types, so those skilled in the art may appropriately determine a shift phase and a shift class such that a shift condition is satisfied in a situation not corresponding to a phase and a class in which disconnection is generated due to injection, depending on the characteristics of a powertrain.

The powertrain mode condition may be a condition for selecting whether to enter injection control according to an embodiment, depending on whether each of driving sources is operated or the engine clutch 130 is engaged. For example, when a target powertrain mode is an HEV mode for series charging, the engine 110 is driven to generate power through the first motor 120 with the engine clutch 130 off, so a reaction force by injection is not transmitted to the drivetrain. Accordingly, there is little necessity of entering the injection control according to an embodiment. However, when a target powertrain mode is a part load or full load HEV mode in which power from the engine 110 is transmitted to wheel, the engine clutch 130 should be engaged, so when the injection control according to an embodiment is applied, a non-driving fuel loss decreases and disconnection can be reduced because reaction force control is applied in injection through the first motor 120.

The SOC condition is satisfied and the injection control according to an embodiment is entered only when an SOC over a predetermined level is secured because the speed of the engine 110 is controlled until the injection point-in-time using the first motor 120. The SOC level for satisfying the SOC condition may be set in each of the kinds of vehicles through tests, but this is only an example and the present disclosure is not limited thereto.

When even any one of the three conditions described above is not satisfied (No in S420), common default injection control may be performed (i.e., injection may be performed before the engine clutch is engaged) (S480).

When all of the preset control entry conditions are satisfied (Yes in S420), the hybrid control unit 240 can delay the injection point-in-time by activating injection inhibition (Injection Inhibit). In other words, the engine control unit 210 does not perform injection on the engine 110 while injection inhibition is activated.

Thereafter, the hybrid control unit 240 can determine whether the injection allowable condition is satisfied (S440). The injection allowable condition may include at least one of an engine RPM condition, a motor RPM condition, and engine clutch engagement condition.

The engine RPM condition can be satisfied when an engine RPM approaches to a control target RPM of the engine 110 within a predetermined level.

The motor RPM condition can be satisfied when the RPM of the motor 120 is greater than a preset RPM. This is because only when the motor RPM is greater than a predetermined level, the engine clutch 130 can be engaged, engine torque can be normally output, and it is possible to avoid an RPM period range (e.g., a resonance period range) in which roughness is generated in engine injection.

The engine clutch engagement condition can be satisfied when the engine clutch 130 is engaged in a lock-up state. This is because when engine injection is not performed in the lock-up state, acceleration may be delayed even though there is intention of acceleration by a driver.

When even any one of these conditions is satisfied, the hybrid control unit 240 determines that the injection allowable condition is satisfied (Yes in S440), thereby being able to turn off injection inhibition, allow injection (Injection Enable), and reduce start roughness due to start of injection using reaction force control through the first motor (S450). By using this method, the first motor is able to start and stop more smoothly, reducing the amount of disconnection that may occur when injection starts.

The reaction force control may be performed until a reference time is reached (S460). The reference time may be determined in accordance with duration of remaining vibration of each engine when injection is performed and may be around 100 ms, but it is only an example and the present disclosure is not limited thereto.

When reaction force control is performed over the reference time (Yes in S460), the hybrid control unit 240 can return the operating point of the first motor to the previous operating point (S470). The previous operating point may mean an operating point according to a common driving situation not considering reaction force control corresponding to injection.

According to the injection control method according to an embodiment described above, there are effects as follows.

First, in common hybrid electric vehicles, disconnection may occur when the engine injection starts, and accordingly, the injection is performed at a relatively low engine RPM with an engine clutch open not to influence the drivetrain. This is because there is limit in reaction force control against disconnection in engine firing unit HSG torque due to limitation in torque responsiveness by an HSG belt.

However, in the hybrid electric vehicle according to an embodiment, since the first motor 120 and the second motor 110 are directly connected, reaction torque control is possible without a specific damping component, so disconnection can be prevented. Accordingly, it is possible to stably attenuate disconnection due to injection start even though torque from an engine may be transmitted to a drivetrain, so it is possible to delay an injection point-in-time regardless of the state of the engine clutch 130. Therefore, injection is not performed until an engine RPM converges on a target RPM, so it is possible to reduce a non-driving fuel loss.

Further, an RPM peak according to injection decreases when an engine is started, so it is possible to reduce the time for synchronizing an engine clutch speed.

Further, since an injection point-in-time is delayed and injection is performed at a relatively high RPM, it is possible to avoid a resonance period range existing in a low RPM period, so it is possible to further reduce disconnection due to injection start.

The present disclosure can be achieved as computer-readable codes on a program-recoded medium. A computer-readable medium includes all kinds of recording devices that keep data that can be read by a computer system. For example, the computer-readable medium may be an HDD (Hard Disk Drive), an SSD (Solid State Disk), an SDD (Silicon Disk Drive), a ROM, a RAM, a CD-ROM, a magnetic tape, a floppy disk, and an optical data storage. Accordingly, the detailed description should not be construed as being limited in all respects and should be construed as an example. The scope of the present disclosure should be determined by reasonable analysis of the claims and all changes within an equivalent range of the present disclosure is included in the scope of the present disclosure.

Although the present disclosure was described with reference to specific embodiments shown in the drawings, it is apparent to those skilled in the art that the present disclosure may be changed and modified in various ways without departing from the scope of the present disclosure which is described in the following claims.

What is claimed is:

1. A method of controlling driving of a hybrid electric vehicle, the method comprising:

inhibiting engine injection when there is an engine start request and a control entry condition is satisfied;

performing the engine injection when an injection allowable condition is satisfied with the engine injection inhibited; and performing a reaction force control along with the engine injection through a first motor directly connected to the engine, wherein the control entry condition includes a powertrain mode condition, and wherein the powertrain mode condition is determined based on whether an engine clutch is engaged so as to determine whether to enter an injection control that performs the reaction force control through the first motor.

2. The method of claim 1, wherein the control entry condition further includes a shift condition, and a State Of Charge (SOC) condition of a battery.

3. The method of claim 2, wherein the control entry condition is satisfied when all of the shift condition, the powertrain mode condition, and the SOC condition are satisfied.

4. The method of claim 2, wherein the shift condition is satisfied in preset shift phase and shift class, the powertrain mode condition is satisfied when a target powertrain mode is a mode in which power from the engine is transmitted to wheels, and the SOC condition is satisfied when a current SOC is over a preset reference SOC.

5. The method of claim 1, wherein the injection allowable condition includes at least one of an engine RPM condition, a motor RPM condition, a state condition of an engine clutch disposed between the engine and a second motor, or a combination thereof.

6. The method of claim 5, wherein the injection allowable condition is satisfied when at least one of the engine RPM condition, the motor RPM condition, and the state condition of the engine clutch is satisfied.

7. The method of claim 5, wherein the engine RPM condition is satisfied when an RPM of the engine approaches a control target RPM, the motor RPM condition is satisfied when an RPM of the first motor is larger than a preset RPM, and the state condition of the engine clutch is satisfied when the engine clutch is in a lock-up state.

8. The method of claim 1, further comprising controlling an operating point of the first motor to a previous operating point after the reaction force control, wherein the reaction force control is continued for a preset time.

9. The method of claim 1, wherein the performing of the engine injection includes turning off the injection inhibition when the injection allowable condition is satisfied.

10. A non-transitory computer-readable recording medium having a program recorded thereon, the program to direct a processor to perform acts of:

inhibiting engine injection when there is an engine start request and a control entry condition is satisfied;

performing the engine injection when an injection allowable condition is satisfied with the engine injection inhibited; and performing a reaction force control along with the engine injection through a first motor directly connected to the engine, wherein the control entry condition includes a powertrain mode condition, and wherein the powertrain mode condition is determined based on whether an engine clutch is engaged so as to determine whether to enter an injection control that performs the reaction force control through the first motor.

11. A hybrid electric vehicle comprising:

a first motor;

an engine directly connected to the first motor;

a second motor directly connected to an input side of a transmission;

an engine clutch configured to selectively connect the engine and the second motor to each other; and a control unit configured to:

inhibit engine injection when there is an engine start request and a control entry condition is satisfied, allow the engine injection when an injection allowable condition is satisfied with the engine injection inhibited, and perform a reaction force control along with the engine injection through the first motor, wherein the control entry condition includes a powertrain mode condition, and a State Of Charge (SOC) condition of a battery, and wherein the powertrain mode condition is determined based on whether an engine clutch is engaged so as to determine whether to enter an injection control that performs the reaction force control through the first motor.

12. The hybrid electric vehicle of claim 11, wherein the control entry condition includes a shift condition, the powertrain mode condition, and the SOC condition of the battery.

13. The hybrid electric vehicle of claim 12, wherein the control unit is further configured to determine that the control entry condition is satisfied when all of the shift condition, the powertrain mode condition, and the SOC condition are satisfied.

14. The hybrid electric vehicle of claim 12, wherein the shift condition is satisfied in preset shift phase and shift class, the powertrain mode condition is satisfied when a target powertrain mode is a mode in which power from the engine is transmitted to wheels of the hybrid electric vehicle, and the SOC condition is satisfied when a current SOC is over a preset reference SOC.

15. The hybrid electric vehicle of claim 11, wherein the injection allowable condition includes at least one of an engine RPM condition, a motor RPM condition, a state condition of the engine clutch or a combination thereof.

16. The hybrid electric vehicle of claim 15, wherein the control unit is further configured to determine that the injection allowable condition is satisfied when at least one of the engine RPM condition, the motor RPM condition, or the state condition of the engine clutch is satisfied.

17. The hybrid electric vehicle of claim 15, wherein the engine RPM condition is satisfied when an RPM of the engine approaches a control target RPM, the motor RPM condition is satisfied when an RPM of the first motor is greater than a preset RPM, and the state condition of the engine clutch is satisfied when the engine clutch is in a lock-up state.

18. The hybrid electric vehicle of claim 11, wherein the control unit is further configured to control the reaction force control to be continued for a preset time and control an operating point of the first motor to a previous operating point after the reaction force control.

19. The hybrid electric vehicle of claim 11, wherein the control unit is further configured to turn off the injection inhibition when the injection allowable condition is satisfied.

* * * * *